United States Patent
Kubota et al.

(10) Patent No.: US 9,944,311 B2
(45) Date of Patent: Apr. 17, 2018

(54) STEERING APPARATUS

(71) Applicants: JTEKT CORPORATION, Osaka-shi, Osaka (JP); TOYOTA JIDOSHA KABUSHIKI KAISHA, Toyota-shi, Aichi-ken (JP)

(72) Inventors: Tatsuro Kubota, Shiki-gun (JP); Tomonori Sugiura, Yamatokoriyama (JP); Yuji Takahashi, Obu (JP); Shoji Ishimura, Kashihara (JP); Shigeru Hoshino, Toyota (JP)

(73) Assignees: JTEKT CORPORATION, Osaka-shi (JP); Toyota Jidosha Kabushiki Kaisha, Toyota (JP)

( * ) Notice: Subject to any disclaimer, the term of this patent is extended or adjusted under 35 U.S.C. 154(b) by 259 days.

(21) Appl. No.: 15/060,041

(22) Filed: Mar. 3, 2016

(65) Prior Publication Data
US 2016/0264169 A1    Sep. 15, 2016

(30) Foreign Application Priority Data

Mar. 9, 2015  (JP) ................................. 2015-046050

(51) Int. Cl.
*B62D 1/19*  (2006.01)
*B62D 1/184*  (2006.01)

(52) U.S. Cl.
CPC ............. *B62D 1/195* (2013.01); *B62D 1/184* (2013.01)

(58) Field of Classification Search
CPC ................................ B60D 1/195; B60D 1/184
See application file for complete search history.

(56) References Cited

U.S. PATENT DOCUMENTS

| 5,009,120 A * | 4/1991 | Iseler | B62D 1/184 280/775 |
|---|---|---|---|
| 8,047,096 B2 * | 11/2011 | Ridgway | B62D 1/184 280/775 |
| 8,555,745 B2 * | 10/2013 | Inoue | B62D 1/195 280/775 |
| 9,242,667 B2 * | 1/2016 | Yoshihara | B62D 1/184 |
| 9,376,136 B2 * | 6/2016 | Yoshihara | B62D 1/195 |

(Continued)

FOREIGN PATENT DOCUMENTS

| EP | 2423073 A1 | 2/2012 |
|---|---|---|
| JP | 2007-168708 A | 7/2007 |

(Continued)

OTHER PUBLICATIONS

Jul. 15, 2016 Search Report issued in European Patent Application No. 16158674.8.

*Primary Examiner* — Karen Beck
(74) *Attorney, Agent, or Firm* — Oliff PLC

(57) ABSTRACT

A steering apparatus includes a steering shaft; a column jacket including an outer jacket including a slit and a pair of fastened portions, and an inner jacket; a fastening mechanism; an engaged tooth formation member including at least one engaged tooth and fixed to the inner jacket; a support shaft including end portions supported by support holes of the fastened portions; a tubular reinforcing member fitted to an outer peripheral surface of the support shaft at a prescribed area between the pair of end portions; and an engaging tooth formation member including an engaging tooth that engages with the engaged tooth.

3 Claims, 6 Drawing Sheets

(56) References Cited

U.S. PATENT DOCUMENTS

| | | | |
|---|---|---|---|
| 9,545,943 B2 * | 1/2017 | Sakuda | B62D 1/185 |
| 9,623,898 B2 * | 4/2017 | Sakuda | B62D 1/185 |
| 2011/0041642 A1 * | 2/2011 | Havlicek | B62D 1/184 |
| | | | 74/493 |
| 2011/0185839 A1 * | 8/2011 | Inoue | B62D 1/184 |
| | | | 74/493 |
| 2013/0139637 A1 * | 6/2013 | Kreuter | B62D 1/183 |
| | | | 74/493 |
| 2015/0266497 A1 | 9/2015 | Yoshihara et al. | |
| 2015/0266499 A1 * | 9/2015 | Yoshihara | B62D 1/184 |
| | | | 74/493 |
| 2016/0075367 A1 * | 3/2016 | Sakuda | B62D 1/185 |
| | | | 74/493 |
| 2016/0144886 A1 * | 5/2016 | Tomiyama | B62D 1/184 |
| | | | 74/493 |
| 2016/0167695 A1 * | 6/2016 | Hagiwara | B62D 1/184 |
| | | | 74/493 |
| 2016/0280248 A1 * | 9/2016 | Uesaka | B62D 1/195 |
| 2016/0288821 A1 * | 10/2016 | Sakuda | B62D 1/185 |
| 2016/0368525 A1 * | 12/2016 | Chiba | B62D 1/195 |
| 2017/0015346 A1 * | 1/2017 | Johta | B62D 1/195 |

FOREIGN PATENT DOCUMENTS

| | | | | |
|---|---|---|---|---|
| JP | 2010-254204 A | | 11/2010 | |
| JP | 2015048012 A | * | 3/2015 | B62D 1/184 |
| JP | 2015-182611 A | | 10/2015 | |
| JP | 2015-182614 A | | 10/2015 | |

* cited by examiner

STEERING APPARATUS

INCORPORATION BY REFERENCE

The disclosure of Japanese Patent Application No. 2015-046050 filed on Mar. 9, 2015 including the specification, drawings and abstract is incorporated herein by reference in its entirety.

BACKGROUND OF THE INVENTION

1. Field of the Invention

The present invention relates to a steering apparatus.

2. Description of Related Art

In Japanese Patent Application Publication No. 2010-254204 (JP 2010-254204 A), a projection and a recess of an eccentric cam biased by a biasing spring constituted by a torsion coil spring so as to rotate about a support shaft mesh with an inner-column side, so that a telescopic lock is achieved. Further, when an adjusting lever and a release lever that rotates together with a fastening shaft in an integrated manner displace the eccentric cam so that the eccentric cam rotates in a release direction against the biasing spring, the telescopic lock is released.

A case, in which the support shaft is constituted by a member (a resin member or the like) that can break at the time of a secondary collision, is assumed. In this case, in a normal time, the support shaft may be deformed due to a load at the time when an operating lever is operated, which may affect a rotational motion of a member supported by the support shaft. As a result, an operation force for the operating lever may vary, and a peak value of the operation force may increase, and thus, it may become difficult to operate (rotate) the operating lever.

SUMMARY OF THE INVENTION

The present invention provides a steering apparatus in which deformation of a support shaft is suppressed so as to allow an operating lever to be easily operated to be rotated.

An aspect of the invention relates to a steering apparatus including a steering shaft extendable in an axial direction; a column jacket extendable in the axial direction, the column jacket including an outer jacket including a slit and a pair of fastened portions provided on respective sides of the slit, and an inner jacket fitted to the outer jacket, the column jacket being configured to support the steering shaft such that the steering shaft is rotatable; a fastening mechanism including a fastening shaft passed through fastening shaft passing holes of the pair of fastened portions, and an operating lever that rotates the fastening shaft, the fastening mechanism being configured to cause the outer jacket to hold the inner jacket by fastening the pair of fastened portions via the fastening shaft; an engaged tooth formation member including at least one engaged tooth and fixed to the inner jacket; a support shaft including a pair of end portions supported by support holes of the pair of fastened portions, the support shaft being configured to break at a time of a secondary collision; a tubular reinforcing member fitted to an outer peripheral surface of the support shaft at a prescribed area between the pair of end portions; and an engaging tooth formation member including an engaging tooth that engages with any one of the at least one engaged tooth, the engaging tooth formation member being rotatably supported by the support shaft via the reinforcing member, and being configured to rotate in accordance with an operation of the operating lever such that the engaging tooth engages with or disengages from any one of the at least one engaged tooth.

According to the above aspect, the support shaft reinforced by the reinforcing member is restrained from deforming due to a load applied from the engaging tooth formation member. Therefore, the engaging tooth formation member is smoothly rotated along with the operation of the operating lever. This makes it possible to operate the operating lever as easily as possible.

In the above aspect, the support shaft may include a pair of to-be-broken portions disposed at positions on respective sides of the prescribed area of the support shaft, the pair of to-be-broken portions being configured to break at the time of the secondary collision.

In the above configuration, in the support shaft, there is a strength difference between a part of the support shaft and the pair of to-be-broken portions on respective sides of the reinforcing member, the part of the support shaft being a part to which the reinforcing member is fitted. This promotes the breakage of the pair of to-be-broken portions at the time of the secondary collision.

In the above aspect, the reinforcing member may have a strength higher than a strength of the support shaft.

In the above configuration, in the support shaft, the strength difference between the prescribed area and the pair of to-be-broken portions on respective sides of the reinforcing member is increased, the prescribed area being reinforced by the reinforcing member having a high strength, which is fitted to the prescribed area. Accordingly, the to-be-broken portions reliably break at the time of the secondary collision.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
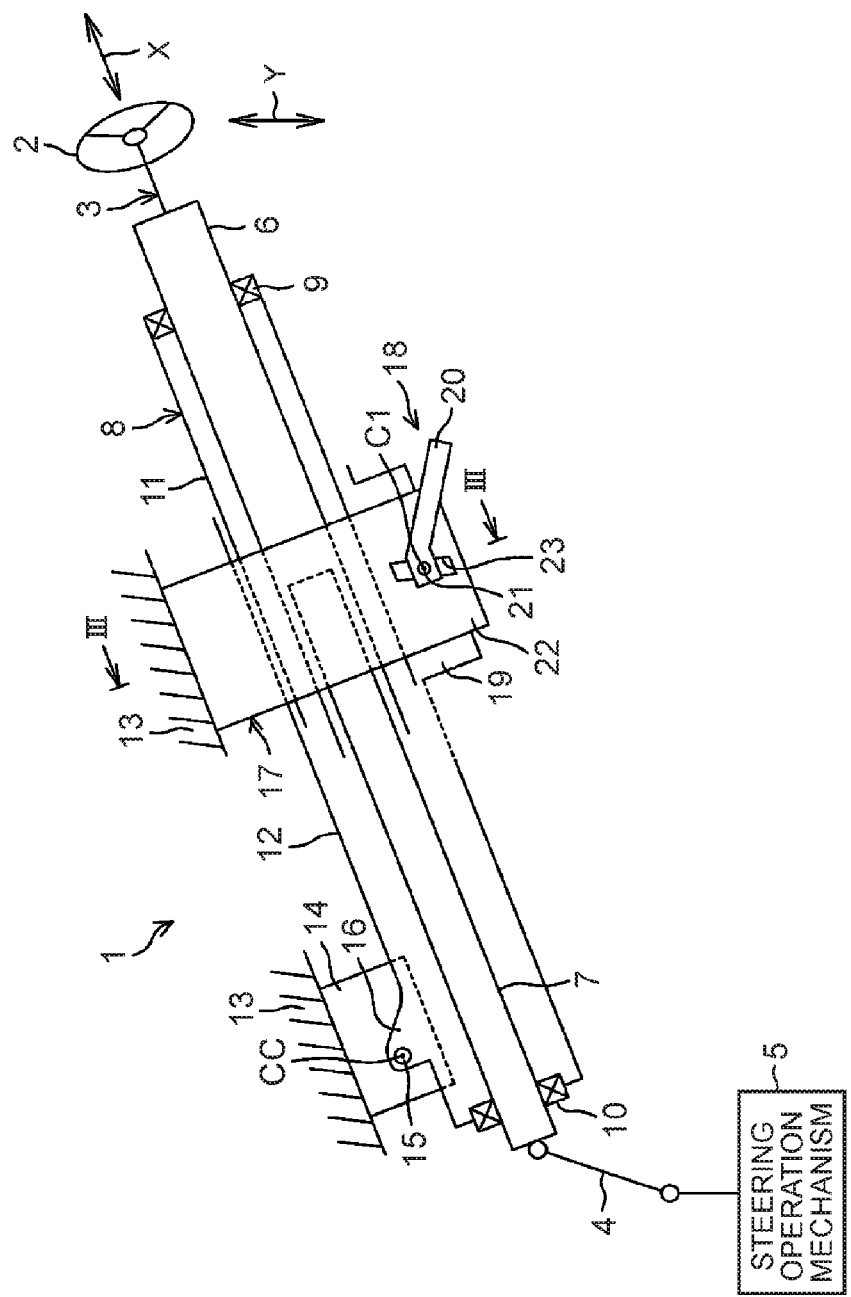
FIG. 1 is a partially broken schematic side view illustrating a schematic configuration of a steering apparatus according to an embodiment of the present invention.

FIG. 1 is a partially broken schematic side view illustrating a schematic configuration of a steering apparatus according to a first embodiment of the present invention. Referring now to FIG. 1, the steering apparatus 1 includes a steering shaft 3 having one end (an axially upper end) to which a steering member 2 such as a steering wheel is connected; and a steering operation mechanism 5 connected to the steering shaft 3 via an intermediate shaft 4 or the like. The steering operation mechanism 5 is, for example, a rack-and-pinion mechanism that steers steered wheels (not shown) in association with the steering operation of the steering member 2. A rotation of the steering member 2 is transmitted to the steering operation mechanism 5 via the steering shaft 3, the intermediate shaft 4, and the like. Further, the rotation transmitted to the steering operation mechanism 5 is converted into an axial movement of a rack shaft (not shown). Thus, the steered wheels are steered.

The steering shaft 3 includes a tubular upper shaft 6 and a lower shaft 7 that are fitted to each other by, for example, spline-fitting or serration-fitting such that the upper shaft 6 and the lower shaft 7 are slidable relative to each other. The steering member 2 is connected to one end of the upper shaft 6. Further, the steering shaft 3 is extendable in an axial direction X. The steering apparatus 1 includes a hollow column jacket 8 that supports the steering shaft 3 such that the steering shaft 3 is rotatable. The steering shaft 3 is inserted into the column jacket 8, so as to be rotatably supported by the column jacket 8 via a plurality of bearings 9, 10.

The column jacket 8 includes a tubular inner jacket 11 that is, for example, an upper jacket, and a tubular outer jacket 12 that is, for example, a lower jacket. The inner jacket 11 and the outer jacket 12 are fitted to each other such that the inner jacket 11 and the outer jacket 12 are slidable relative to each other. The column jacket 8 is extendable in the axial direction X. The inner jacket 11 on an upper side is connected, via the bearing 9, to an upper shaft 6 so as to be movable together with the upper shaft 6 in the axial direction X. The outer jacket 12 on a lower side supports the lower shaft 7 via the bearing 10 such that the lower shaft 7 is rotatable. The steering apparatus 1 includes a fixed bracket 14 fixed to a vehicle body 13; a tilt central shaft 15 supported by the fixed bracket 14; and a column bracket 16 fixed to an outer peripheral surface of the outer jacket 12 and rotatably supported by the tilt central shaft 15. The column jacket 8 and the steering shaft 3 can pivot (tilt) in a tilt direction Y using a tilt center CC as a fulcrum. The tilt center CC is a central axis of the tilt central shaft 15.

When the steering shaft 3 and the column jacket 8 are caused to pivot (tilt) about the tilt center CC, a position of the steering member 2 can be adjusted (so-called tilt adjustment). Further, when the steering shaft 3 and the column jacket 8 are extended and contracted in the axial direction X, the position of the steering member 2 can be adjusted (so-called telescopic adjustment). The steering apparatus 1 includes a bracket 17 fixed to the vehicle body 13, and a fastening mechanism 18 that achieves a tilt lock and a telescopic lock by fastening a pair of fastened portions 19. The fastened portions 19 are made of the same material as that of the outer jacket 12 so as to be integrated with the upper portion of the outer jacket 12 in the axial direction X.

Figure 2:
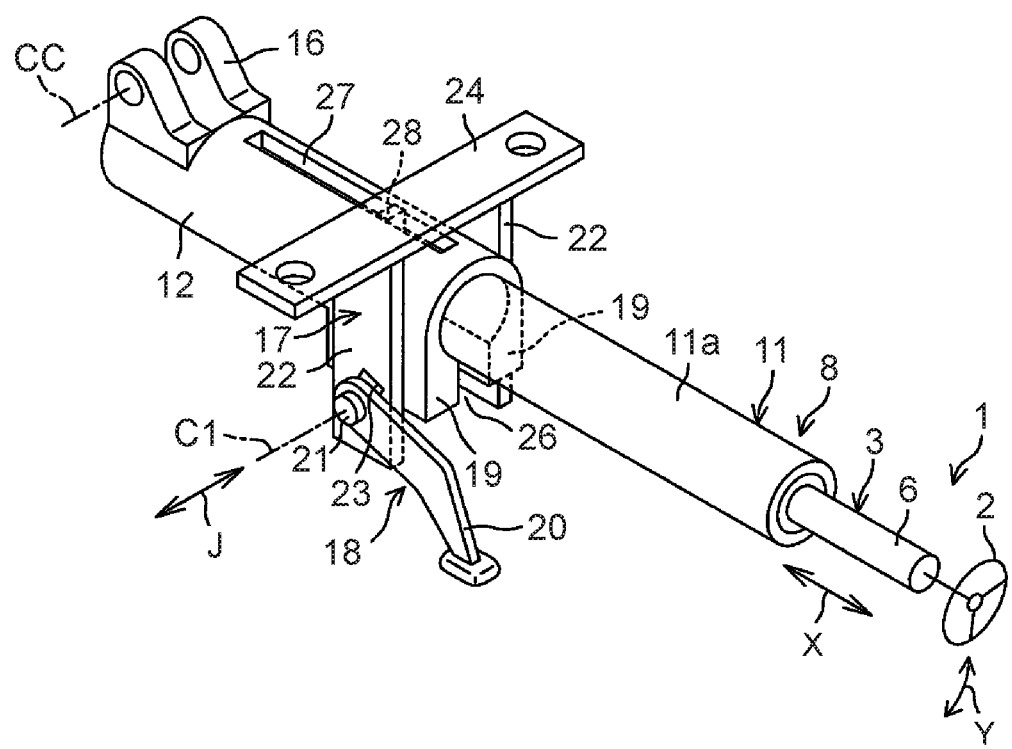
FIG. 2 is a schematic perspective view of the steering apparatus.

As illustrated in FIG. 1 and FIG. 2 that is a schematic perspective view, the fastening mechanism 18 includes an operating lever 20 as an operating member rotated by a driver, and a fastening shaft 21 that is rotatable together with the operating lever 20 in an integrated manner. A central axis C1 of the fastening shaft 21 coincides with a center of rotation of the operating lever 20. As illustrated in FIG. 2, the outer jacket 12 has a slit 26 extending downward from an upper end in the axial direction X. The fastened portions 19 are disposed on respective sides of the slit 26. By clamping the pair of fastened portions 19, a diameter of the outer jacket 12 can be reduced elastically.

The outer jacket 12 has a guide groove 27 extending in the axial direction X. A guided protrusion 28 fixed to the inner jacket 11 is fitted to the guide groove 27. The guide groove 27 guides an axial movement of the inner jacket 11 via the guided protrusion 28, and restricts a rotation of the inner jacket 11 relative to the outer jacket 12. Further, due to fitting of the guided protrusion 28 to the guide groove 27, falling-off of the inner jacket 11 from the outer jacket 12 is prevented.

The fastening mechanism 18 achieves a tilt lock by fastening the bracket 17 to the pair of fastened portions 19 of the outer jacket 12 via the fastening shaft 21. Further, the fastening mechanism 18 achieves a telescopic lock such that the inner jacket 11 is clamped immovably in the axial direction X by the outer jacket 12 that is reduced in diameter, by clamping the pair of fastened portions 19 of the outer jacket 12. Thus, the position of the steering member 2 is fixed with respect to the vehicle body 13 (see FIG. 1).

Figure 3:
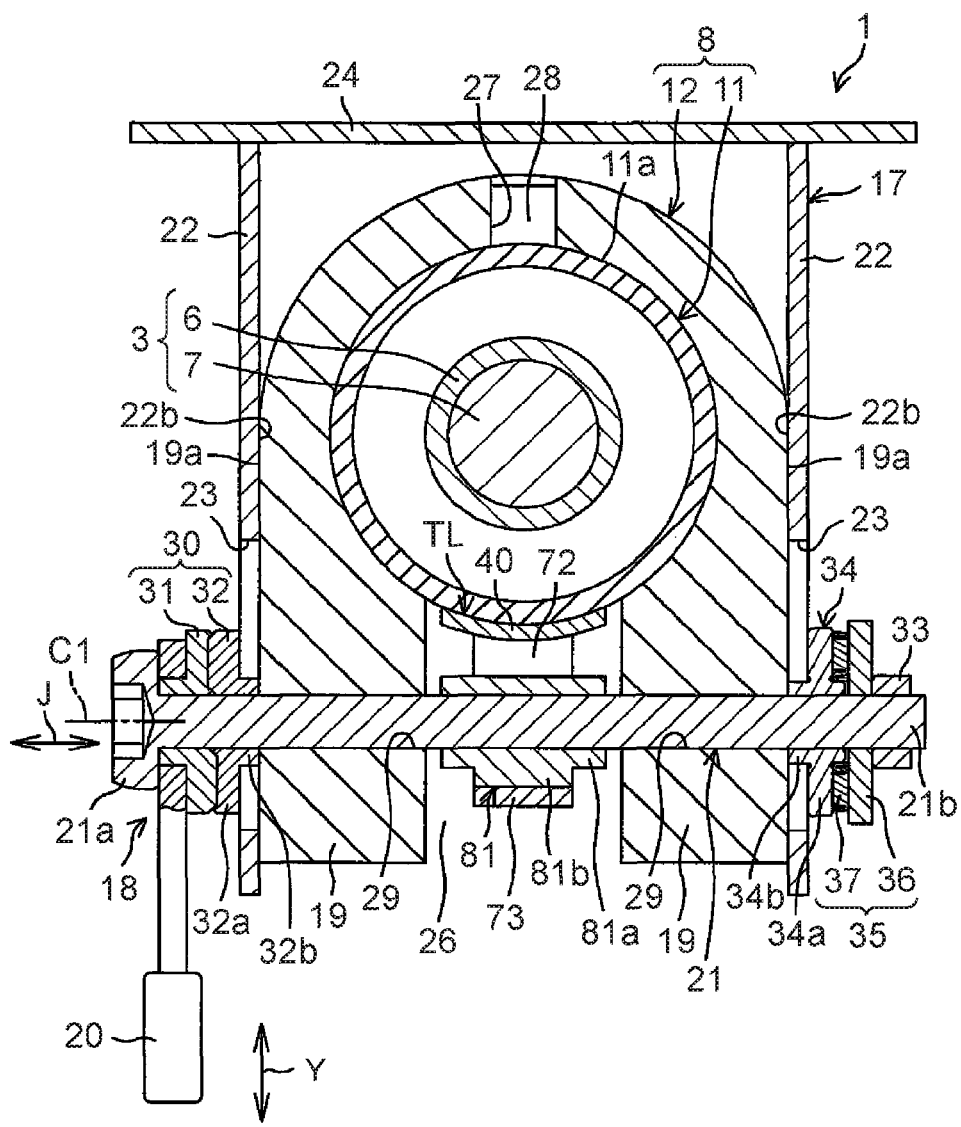
FIG. 3 is a sectional view of a main part of the steering apparatus and corresponds to a sectional view taken along a line III-III in FIG. 1.

The fastening shaft 21 is passed through tilt elongate holes 23 that are respectively provided in a pair of side plates 22 (only one side plate 22 is illustrated in FIG. 1) of the bracket 17 so as to extend in the tilt direction Y. As illustrated in FIG. 3, the bracket 17 includes a mounting plate 24 attached to the vehicle body 13, and a pair of side plates 22 extending downward in the tilt direction Y from respective ends of the mounting plate 24. The pair of fastened portions 19 of the outer jacket 12 is disposed between the pair of side plates 22, and each of the fastened portions 19 has a plate shape extending along an inner surface 22*b* of a corresponding one of the side plates 22. The inner surface 22*b* of each of the side plates 22 is opposed to an outer surface 19*a* of a corresponding one of the fastened portions 19.

Each of the fastened portions 19 of the outer jacket 12 has a fastening shaft passing hole 29, which is a round hole through which the fastening shaft 21 is passed. At the time of tilt adjustment, the fastening shaft 21, the outer jacket 12, the inner jacket 11, and the steering shaft 3 move together in the tilt direction Y. The fastening shaft 21 is constituted by a bolt passing through the tilt elongate holes 23 of both side plates 22 of the bracket 17 and the fastening shaft passing holes 29 of both fastened portions 19 of the outer jacket 12. A larger-diameter head 21*a* provided in a first end of the fastening shaft 21 is fixed so as to be rotatable together with the operating lever 20 in an integrated manner.

The fastening mechanism 18 further includes a force conversion mechanism 30 that is provided between the head 21*a* of the fastening shaft 21 and one of the side plates 22. The force conversion mechanism 30 converts an operation torque of the operating lever 20 into an axial force of the fastening shaft 21 (a fastening force to fasten the pair of side plates 22). The force conversion mechanism 30 includes a rotating cam 31 and a fastening member 32. The rotating cam 31 is connected to the operating lever 20 so as to rotate together with the operating lever 20 in an integrated manner. The movement of the rotating cam 31 relative to the fastening shaft 21 in a fastening shaft direction J is restricted. The fastening member 32 is a non-rotatable cam that achieves cam engagement with the rotating cam 31 to fasten one of the side plates 22.

The fastening mechanism 18 further includes a nut 33 screwed to a threaded portion 21*b* of a second end of the fastening shaft 21, a fastening member 34 that fastens the other one of the side plates 22, and an intervening member 35 provided between the fastening member 34 and the nut 33. The intervening member 35 includes a washer 36 provided between the nut 33 and the fastening member 34;

and a needle roller bearing 37 provided between the washer 36 and the fastening member 34.

The fastening member 34 and the intervening member 35 are provided between the nut 33 and the other one of the side plates 22 of the bracket 17. The rotating cam 31, the fastening member 32 (the non-rotatable cam), the fastening member 34, and the intervening member 35 are supported by an outer peripheral surface of the fastening shaft 21. The fastening member 32 (the non-rotatable cam) and the fastening member 34 include respective fastening plate portions 32a, 34a that fasten the corresponding side plates 22, and respective boss portions 32b, 34b fitted to the corresponding tilt elongate holes 23. Rotations of the fastening members 32, 34 are restricted due to fitting of respective boss portions 32b, 34b to the corresponding tilt elongate holes 23.

Further, the fastening member 32 (the non-rotatable cam) and the fastening member 34 are supported by the fastening shaft 21 so as to be movable in the fastening shaft direction J. Along with the rotation of the operating lever 20 toward a lock direction, the rotating cam 31 rotates relative to the fastening member 32 (the non-rotatable cam). Thus, the fastening member 32 is moved in the fastening shaft direction J, so that the pair of side plates 22 of the bracket 17 is clamped and fastened between the fastening members 32, 34 (i.e., between the fastening plate portions 32a, 34a of the fastening members 32, 34).

Thus, each of the side plates 22 of the bracket 17 fastens a corresponding one of the fastened portions 19 of the outer jacket 12. As a result, the movement of the outer jacket 12 in the tilt direction Y is restricted, so that a tilt lock is achieved. Further, when both fastened portions 19 are fastened, the outer jacket 12 is elastically reduced in diameter, so as to fasten the inner jacket 11. Thus, the movement of the inner jacket 11 in the axial direction X is restricted, so that a telescopic lock is achieved.

Figure 4:
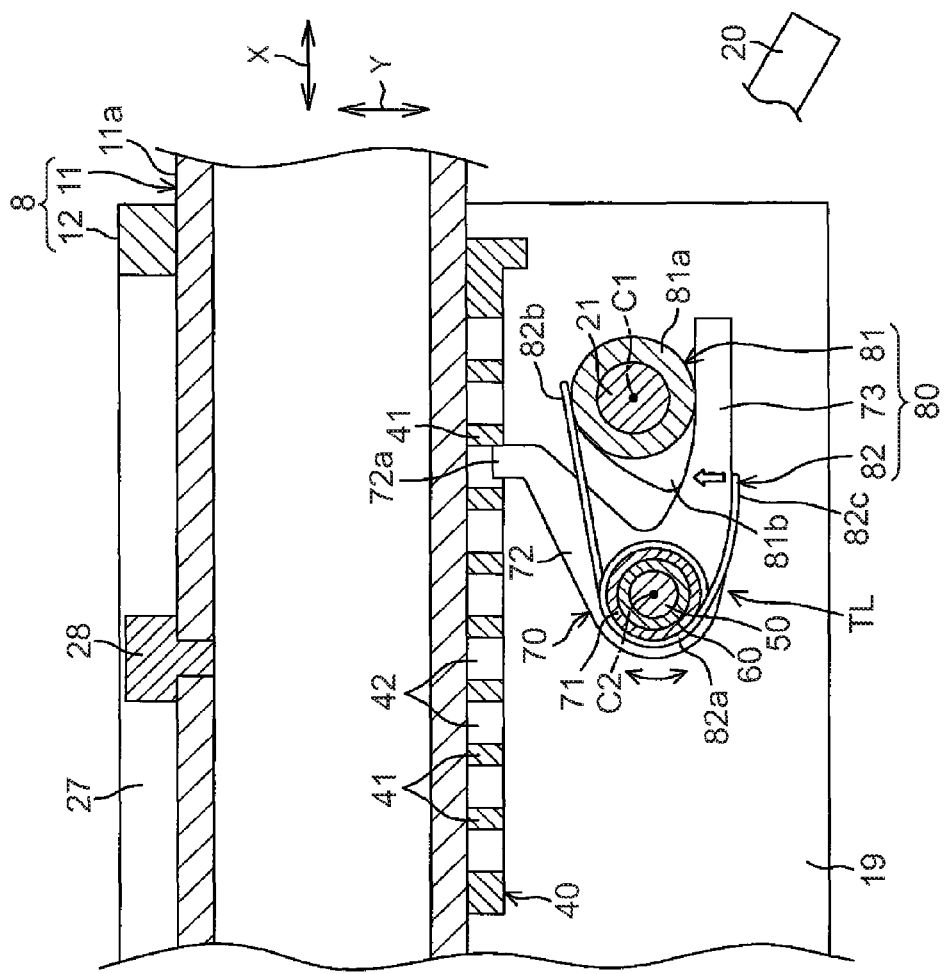
FIG. 4 is a sectional view of the main part of the steering apparatus and illustrates a locked state of a tooth lock mechanism.
Figure 5:
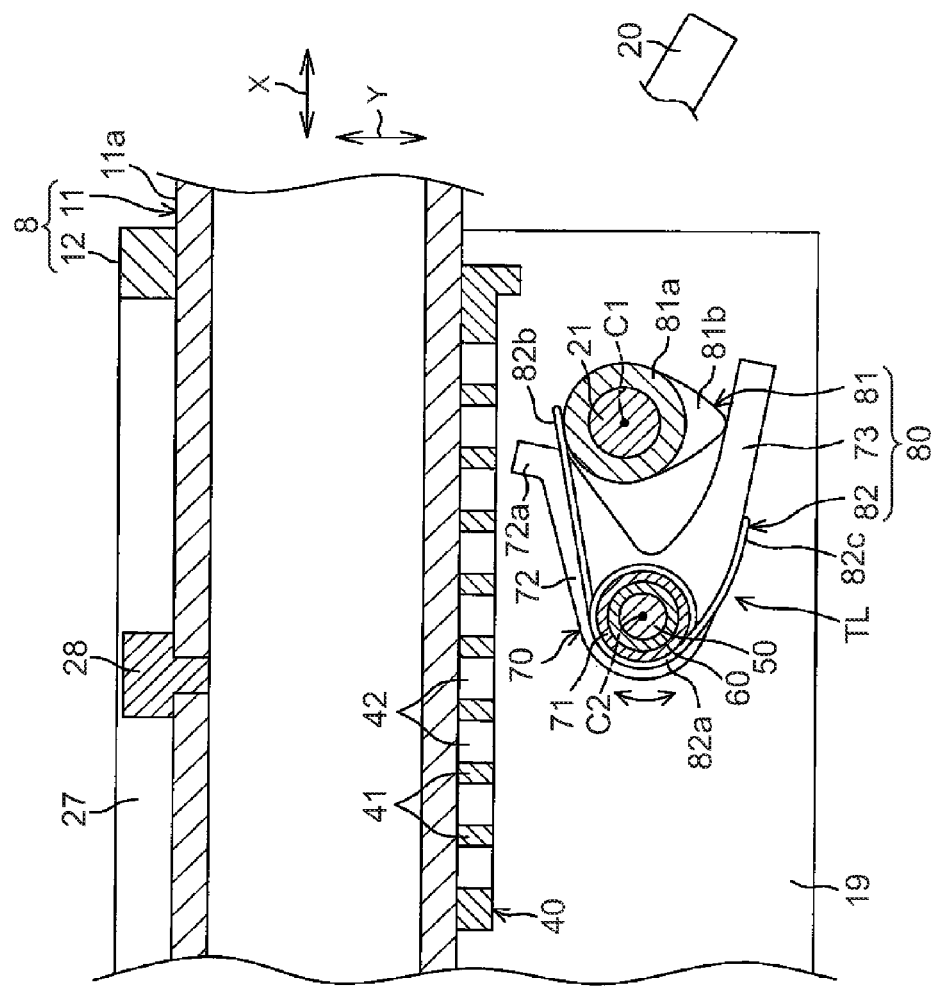
FIG. 5 is a sectional view of the main part of the steering apparatus and illustrates an unlocked state of the tooth lock mechanism.

As illustrated in FIGS. 4 and 5, the steering apparatus 1 includes a tooth lock mechanism TL to improve the force of retaining the telescopic lock. FIG. 4 illustrates a locked state of the tooth lock mechanism TL, and FIG. 5 illustrates an unlocked state (a lock released state) of the tooth lock mechanism TL. The tooth lock mechanism TL includes an engaged tooth formation member 40 fixed to an outer peripheral surface 11a of the inner jacket 11, a support shaft 50 made of resin and supported by the pair of fastened portions 19, an engaging tooth formation member 70 rotatably supported by the support shaft 50 via a reinforcing member 60, and a linkage mechanism 80 that links a rotation of the engaging tooth formation member 70 with a rotation of the fastening shaft 21 (i.e., that causes the engaging tooth formation member 70 to rotate as the fastening shaft 21 rotates).

Figure 6:
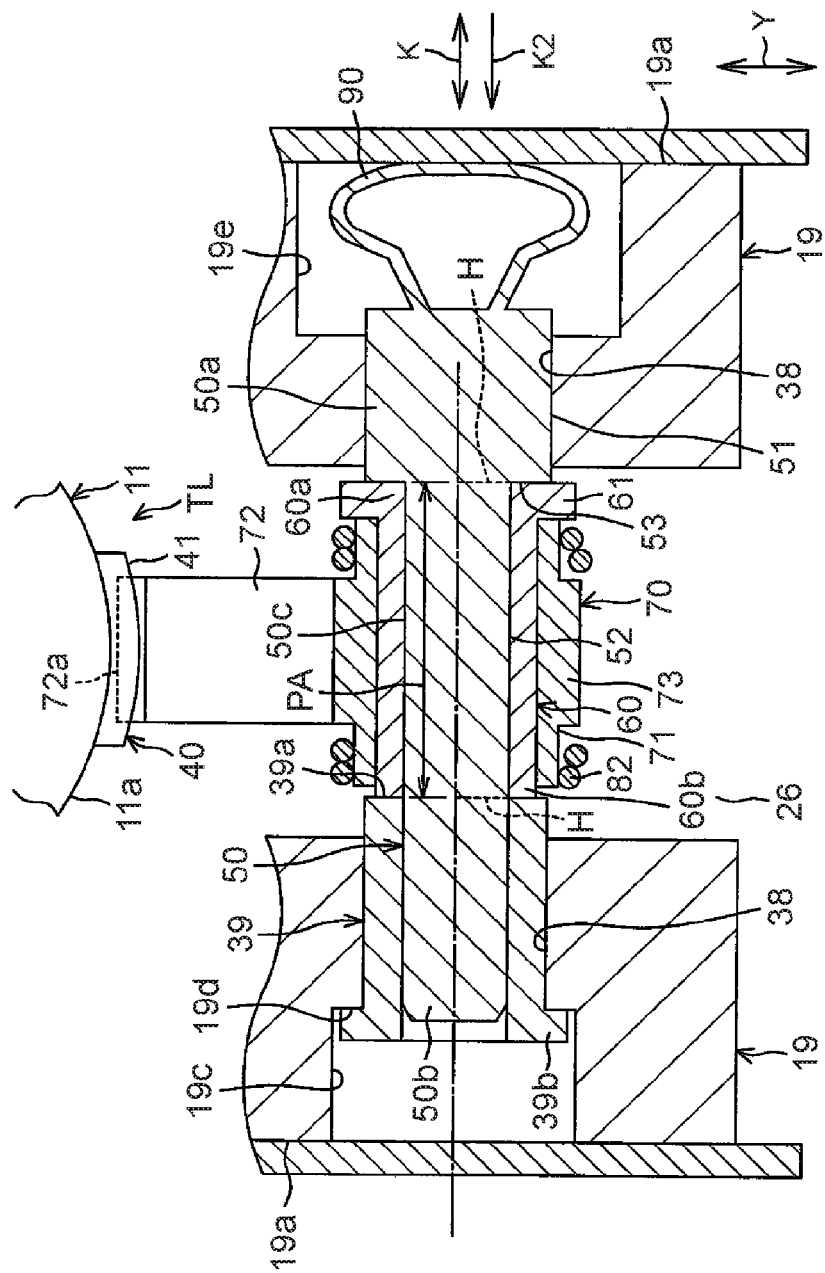
FIG. 6 is a sectional view of the main part of the steering apparatus and illustrates a mechanism that supports an engaging tooth formation member of the tooth lock mechanism.

The engaged tooth formation member 40 includes a plurality of engaged teeth 41 such that the engaged teeth 41 are arranged at prescribed intervals in the axial direction X. A plurality of grooves 42 may be formed at prescribed intervals in the axial direction X on an elongate plate as a material such that each of the engaged teeth 41 is formed between adjacent grooves 42. As illustrated in FIG. 6, the support shaft 50 includes a first end portion 50a and a second end portion 50b that are both end portions of the support shaft 50 in a support shaft direction K which is a central axis direction of the support shaft 50. Further, an outer peripheral surface 50c of the support shaft 50 includes a large diameter portion 51 provided in the first end portion 50a, a small diameter portion 52 provided in a remaining part other than the large diameter portion 51 and having a diameter smaller than the large diameter portion 51, and a stepped portion 53 constituted by an axially perpendicular surface (i.e., a surface perpendicular to an axial direction of the support shaft 50) formed between the large diameter portion 51 and the small diameter portion 52.

The large diameter portion 51 of the first end portion 50a is directly supported by a support hole 38 of one of the fastened portions 19 (a right one in FIG. 6). The second end portion 50b is inserted into a tubular bush 39 press-fitted and fixed to a support hole 38 of the other one of the fastened portions 19 (a left one in FIG. 6), so that the second end portion 50b is supported. Since the bush 39 is press-fitted and fixed to the support hole 38, an axial movement of the bush 39 relative to the support hole 38 is restricted.

More specifically, the bush 39 includes one end surface 39a that contacts an end surface of the reinforcing member 60, and also includes a positioning flange 39b provided on an end opposite to the one end surface 39a and extending radially outwardly. The positioning flange 39b is accommodated in a receptacle recessed portion 19c provided in the outer surface 19a of the other fastened portion 19. The receptacle recessed portion 19c communicates with the support hole 38, and has a diameter larger than a diameter of the support hole 38. An end surface of the positioning flange 39b contacts a bottom part 19d of the receptacle recessed portion 19c such that the bush 39 is positioned in an axial direction of the support hole 38.

The reinforcing member 60 is fitted to a prescribed area PA between both end portions 50a, 50b of the support shaft 50, in the outer peripheral surface 50c of the support shaft 50 (the prescribed area PA corresponds to an axial area of a part of the small diameter portion 52). In other words, the reinforcing member 60 is fitted to the outer peripheral surface 50c of the support shaft 50 at the prescribed area PA between the both end portions 50a, 50b. The reinforcing member 60 is provided between the one end surface 39a of the bush 39 and the stepped portion 53. The one end surface 39a of the bush 39 and the stepped portion 53 are disposed between the pair of fastened portions 19 (that is, in the slit 26). A first end portion 60a of the reinforcing member 60 is in contact with the stepped portion 53 between the large diameter portion 51 and the small diameter portion 52. More specifically, a flange 61, which is provided in the first end portion 60a of the reinforcing member 60 and extends radially outwardly, is in contact with the stepped portion 53. An end surface of a second end portion 60b of the reinforcing member 60 is in contact with the one end surface 39a of the bush 39.

The flange 61 of the reinforcing member 60 is provided between one end surface of a boss portion 71 of the engaging tooth formation member 70 and the stepped portion 53 of the support shaft 50. The flange 61 prevents the entire reinforcing member 60 from being fitted into the boss portion 71. A biasing member 90 provided integrally with the first end portion 50a of the support shaft 50 is disposed between the first end portion 50a (that is, the large diameter portion 51) of the support shaft 50 and the side plate 22 that is opposed to the first end portion 50a. The biasing member 90 biases the support shaft 50 using a reaction force that presses the side plate 22, in a biasing direction K2 directed toward the second end portion 20b-side in the support shaft direction K.

The biasing member 90 is accommodated in a receptacle recessed portion 19e provided in an outer surface 19a of the one fastened portion 19. The receptacle recessed portion 19e communicates with the support hole 38 and has a diameter larger than a diameter of the support hole 38. A biasing force of the biasing member 90 is received by the one end surface 39a of the bush 39 via the stepped portion 53 and the reinforcing member 60. A movement of the support shaft 50 in the biasing direction K2 is restricted by the one end surface 39a of the bush 39. That is, the one end surface 39a of the bush 39 functions as a positioning portion that positions the support shaft 50 in the biasing direction K2. In other words, the other fastened portion 19 indirectly positions the support shaft 50 via the bush 39.

In the support shaft 50, a pair of to-be-broken portions H is provided. The to-be-broken portions H are provided at positions on respective sides of the prescribed area PA reinforced by the reinforcing member 60 fitted thereto (that is, positions on respective sides of the reinforcing member 60). At the time of a secondary collision, the support shaft 50 breaks at the pair of to-be-broken portions H. More specifically, when a prescribed impact load or more is applied from the steering shaft 3 to the engaging tooth formation member 70 via the inner jacket 11 and the engaged tooth formation member 40 at the time of a secondary collision, the support shaft 50 breaks at the pair of to-be-broken portions H.

The reinforcing member 60 has a strength higher than a strength of the support shaft 50, so as to strengthen the degree of reinforcement for the prescribed area PA. In a case where the support shaft 50 is made of resin, a resin member or a metal member that has a strength higher than a strength of the resin forming the support shaft 50 is used as the reinforcing member 60. The reinforcing member 60 is a collar, for example. The engaging tooth formation member 70 includes the boss portion 71 that surrounds the outer peripheral surface of the support shaft 50, and an engaging tooth formation arm 72 extending in a projecting manner from an outer peripheral surface of the boss portion 71 and having a distal end provided with an engaging tooth 72a that can engage with any one of the engaged teeth 41.

The linkage mechanism 80 includes a cam member 81 connected to the fastening shaft 21 so as to be rotatable together with the fastening shaft 21 in an integrated manner; a cam follower arm 73 that is provided so as to be rotatable together with the engaging tooth formation member 70 in an integrated manner, and driven by the cam member 81; and a biasing member 82 that rotatively biases the engaging tooth formation member 70 via the cam follower arm 73 in such a direction that the engaging tooth 72a engages with any one of the engaged teeth 41. The cam member 81 includes a boss portion 81a fitted to an outer peripheral surface of the fastening shaft 21; and a cam projection 81b projecting radially outwardly from the boss portion 81a.

The biasing member 82 is constituted by a torsion spring, for example. That is, the biasing member 82 includes a coiled portion 82a that surrounds the boss portion 71 of the engaging tooth formation member 70; a first engagement portion 82b that extends from the coiled portion 82a so as to engage with an outer peripheral surface of the boss portion 81a of the cam member 81; and a second engagement portion 82c that engages with the cam follower arm 73. The biasing member 82 rotatively biases the engaging tooth formation member 70 in a counterclockwise direction in FIG. 4 (indicate by a hollow arrow in FIG. 4). In a state where the engaging tooth 72a of the engaging tooth formation member 70 biased by the biasing member 82 so as to rotate counterclockwise engages with any one of the engaged teeth 41, a tooth lock is achieved as illustrated in FIG. 4.

That is, when the operating lever 20 and the fastening shaft 21 are rotated in a lock direction (a clockwise direction in FIG. 5) about the central axis C1 of the fastening shaft 21 from an unlocking state illustrated in FIG. 5, the cam projection 81b allows a counterclockwise rotation of the cam follower arm 73 about a central axis C2 of the support shaft 50. Thus, due to the action of the biasing member 82, the engaging tooth formation member 70 rotates counterclockwise, so that the engaging tooth 72a engages with any one of the engaged teeth 41 as illustrated in FIG. 4. In this way, a tooth lock is achieved.

When the operating lever 20 is rotated in an unlocking direction (counterclockwise in FIG. 4) from the locked state illustrated in FIG. 4, the cam projection 81b rotates the engaging tooth formation member 70 clockwise about the central axis C2 via the cam follower arm 73 against the biasing member 82, as illustrated in FIG. 5. Thus, the engaging tooth 72a is disengaged from any one of the engaged teeth 41, so that the tooth lock is released.

According to the present embodiment, the support shaft 50 reinforced by the reinforcing member 60 is restrained from deforming due to a load applied from the engaging tooth formation member 70. Therefore, the engaging tooth formation member 70 is smoothly rotated along with the rotation operation of the operating lever 20. This makes it possible to reduce the variation of the operation force of the operating lever 20 and to decrease the peak value of the operation force as much as possible. As a result, the operating lever 20 is easily operated to be rotated.

Further, in the support shaft 50, there is a strength difference between a part of the support shaft 50 and the pair of to-be-broken portions H on respective sides of the reinforcing member 60, the part of the support shaft 50 being a part to which the reinforcing member 60 is fitted. That is, the pair of to-be-broken portions H has a strength lower than a strength of the part of the support shaft 50 to which the reinforcing member 60 is fitted. Therefore, the breakage of the pair of to-be-broken portions H is promoted at the time, of a secondary collision, and thus, it is possible to reliably break the pair of to-be-broken portions H. Further, the reinforcing member 60 has a strength higher than that of the support shaft 50. This accordingly increases the strength difference between the part of the support shaft 50 and the pair of to-be-broken portions H on respective sides of the reinforcing member 60, the part of the support shaft 50 being reinforced by the reinforcing member 6Q with a high strength, which is fitted to the part of the support shaft 50. Thus, at the time of a secondary collision, the to-be-broken portions H reliably break. This makes it possible to achieve impact absorption as stably and reliably as possible.

The present invention is not limited to the above embodiment. For example, the steering apparatus 1 is not limited to a manual-type steering apparatus, and may be an electric power steering apparatus in which power of an electric motor is supplied to the steering shaft 3 so as to assist steering. In addition, the embodiment of the present invention may be modified variously within the scope of the present invention.

What is claimed is:

1. A steering apparatus comprising:
a steering shaft extendable in an axial direction;
a column jacket extendable in the axial direction, the column jacket including an outer jacket including a slit and a pair of fastened portions provided on respective sides of the slit, and an inner jacket fitted to the outer jacket, the column jacket being configured to support the steering shaft such that the steering shaft is rotatable;
a fastening mechanism including a fastening shaft passed through fastening shaft passing holes of the pair of fastened portions, and an operating lever that rotates the fastening shaft, the fastening mechanism being configured to cause the outer jacket to hold the inner jacket by fastening the pair of fastened portions via the fastening shaft;

an engaged tooth formation member including at least one engaged tooth and fixed to the inner jacket;

a support shaft including a pair of end portions supported by support holes of the pair of fastened portions, the support shaft being configured to break at a time of a secondary collision;

a tubular reinforcing member fitted to an outer peripheral surface of the support shaft at a prescribed area between the pair of end portions; and an engaging tooth formation member including an engaging tooth that engages with any one of the at least one engaged tooth, the engaging tooth formation member being rotatably supported by the support shaft via the reinforcing member, and being configured to rotate in accordance with an operation of the operating lever such that the engaging tooth engages with or disengages from any one of the at least one engaged tooth.

2. The steering apparatus according to claim 1, wherein the support shaft includes a pair of to-be-broken portions disposed at positions on respective sides of the prescribed area of the support shaft, the pair of to-be-broken portions being configured to break at the time of the secondary collision.

3. The steering apparatus according to claim 1, wherein the reinforcing member has a strength higher than a strength of the support shaft.

* * * * *